(12) United States Patent
Harris

(10) Patent No.: US 8,850,361 B2
(45) Date of Patent: Sep. 30, 2014

(54) ENHANCING TOUCH AND FEEL ON THE INTERNET

(76) Inventor: Scott C Harris, Rancho Santa Fe, CA (US)

( * ) Notice: Subject to any disclaimer, the term of this patent is extended or adjusted under 35 U.S.C. 154(b) by 1967 days.

(21) Appl. No.: 11/277,097

(22) Filed: Mar. 21, 2006

(65) Prior Publication Data

US 2006/0178952 A1   Aug. 10, 2006

Related U.S. Application Data

(62) Division of application No. 09/505,646, filed on Feb. 16, 2000, now Pat. No. 7,111,252.

(60) Provisional application No. 60/155,543, filed on Sep. 22, 1999.

(51) Int. Cl.
| | |
|---|---|
| *G06F 13/00* | (2006.01) |
| *G06F 15/00* | (2006.01) |
| *G06Q 30/02* | (2012.01) |
| *H04N 21/61* | (2011.01) |
| *G06F 17/50* | (2006.01) |
| *G06F 17/30* | (2006.01) |
| *G06Q 30/06* | (2012.01) |
| *H04N 21/44* | (2011.01) |
| *H04N 7/173* | (2011.01) |
| *H04N 21/81* | (2011.01) |
| *H04N 21/234* | (2011.01) |

(52) U.S. Cl.
CPC ........... *H04N 21/6125* (2013.01); *G06Q 30/02* (2013.01); *G06F 2217/38* (2013.01); *G06F 17/5018* (2013.01); *G06F 17/3089* (2013.01); *G06Q 30/0601* (2013.01); *G06Q 30/0641* (2013.01); *H04N 21/44012* (2013.01); *G06Q 30/0603* (2013.01); *H04N 7/17318* (2013.01); *G06F 2217/04* (2013.01); *G06Q 30/06* (2013.01); *H04N 21/812* (2013.01); *H04N 21/23412* (2013.01); *G06Q 30/0643* (2013.01)
USPC .......................................... 715/851; 715/853

(58) Field of Classification Search
CPC .......................... G06F 2217/38; G06F 17/5018
USPC ......... 715/851–853, 763–765, 766, 738–739; 709/209, 229
See application file for complete search history.

(56) References Cited

U.S. PATENT DOCUMENTS

| | | |
|---|---|---|
| 4,796,201 A | 1/1989 | Wake |
| 5,214,696 A | 5/1993 | Keiser et al. |

(Continued)

OTHER PUBLICATIONS

Barn&Nobel Inc Goes live on America Online, Mar. 18, 1997.*

(Continued)

*Primary Examiner* — Kevin Nguyen
(74) *Attorney, Agent, or Firm* — Law Office of Scott C. Harris, Inc.

(57) ABSTRACT

A system for enabling touch and feel over the internet provides a three-dimensional representation of a good being sold, that three-dimensional representation being viewable from a number of different directions. In one embodiment, the good being sold is in a package and the package is displayed from the number of different directions. Another embodiment has the good being a book, and the inside and outside covers of the book are displayed and specified pages of the book can be displayed. The user can read from either the label or the covers just like as if the were actually handling the good.

9 Claims, 12 Drawing Sheets

(56) References Cited

U.S. PATENT DOCUMENTS

| | | | |
|---|---|---|---|
| 5,463,725 | A | 10/1995 | Henckel et al. |
| 5,465,213 | A | 11/1995 | Ross |
| 5,515,268 | A | 5/1996 | Yoda |
| 5,532,920 | A | 7/1996 | Hartrick et al. |
| 5,745,109 | A | 4/1998 | Nakano et al. |
| 5,748,188 | A | 5/1998 | Hu et al. |
| 5,751,931 | A | 5/1998 | Cox et al. |
| 5,761,485 | A | 6/1998 | Munyan |
| 5,781,189 | A | 7/1998 | Holleran et al. |
| 5,838,326 | A | 11/1998 | Card et al. |
| 5,841,440 | A | 11/1998 | Guha |
| 5,848,399 | A | 12/1998 | Burke ............................ 705/27 |
| 5,852,800 | A | 12/1998 | Modeste et al. |
| 5,870,220 | A | 2/1999 | Migdal et al. |
| 5,907,328 | A | 5/1999 | Brush, II et al. |
| 5,926,179 | A | 7/1999 | Matsuda et al. |
| 5,930,769 | A | 7/1999 | Rose |
| 5,933,498 | A | 8/1999 | Schneck et al. |
| 5,956,034 | A | 9/1999 | Sachs et al. |
| 5,957,697 | A | 9/1999 | Iggulden et al. |
| 6,029,141 | A | 2/2000 | Bezos et al. |
| 6,037,954 | A | 3/2000 | McMahon |
| 6,038,598 | A | 3/2000 | Danneels |
| 6,201,546 | B1 | 3/2001 | Bodor et al. ................... 345/620 |
| 6,243,093 | B1 * | 6/2001 | Czerwinski et al. .......... 715/848 |
| 6,307,544 | B1 | 10/2001 | Harding |
| 6,401,084 | B1 | 6/2002 | Ortega et al. |
| 6,442,285 | B2 | 8/2002 | Rhoads et al. |
| 6,486,695 | B1 | 11/2002 | Nakagawara ................... 326/14 |
| 6,486,895 | B1 * | 11/2002 | Robertson et al. ............ 715/776 |
| 6,661,419 | B2 | 12/2003 | McKeeth |
| 6,933,928 | B1 | 8/2005 | Lilienthal |
| 7,401,286 | B1 | 7/2008 | Hendricks et al. |
| 7,835,989 | B1 | 11/2010 | Hendricks et al. |
| 2002/0019950 | A1 | 2/2002 | Huffman et al. |

OTHER PUBLICATIONS

1st booklibrary , 1997.*
1stbooks Library, date unknown, lists copyright date of 1997.
Court Papers from litigation in Illinois Computer Research, LLC, v Harpo Productions Inc.
Claim Construction Order from U.S. Patent No. 7111252.
Book.Browse from Archive.org.
Tuesdays with Mory from Archive.org.
Book Browse v2 from Archive.org.
Frequently Asked Questions about Book Browse from Archive.org.
"Children & Amp; Young Adult" pp. 1-9.
"Clandestine Episode 1" pp. 1-7.
Marc Cerasini "Clandestine the Lurker Files," pp. 1-2.
"Hard Shell Word Factory—Electronic Books" pp. 1-10.
"Ric Haynes, Rejected From Mars," pp. 1-7.
"14″ x 10″ ;56 pages; edition of 30. Linocuts cut by the artist," pp. 1-7.
"Printer: Philip Gallo. Hand-Painted w/Water color," pp. 1-7.
Text: Ric Haynes, Jill Jevne made the bindings, pp. 1-7.
Ric Haynes, "″ Rejected From Mars & quot" pp. 1-7.
B. Eager et al., Special Edition "Using the World Wide Web and Mosaic," pp. 0064-0069.
Case: 1:08-cv-07322 Document#70 Filed: Jun. 26, 2009 p. 6 of 26 p. ID#:661, pp. 0070-0090.
W. Linn, "Methods and Systems Employing Digital Watermarking," provisional cover sheet and specification filed Ma 19, 1999, pp. 1-47.
R. Leighton, Exhibit A, "Dogs and All About Them," pp. 1-6.
R. H. Reid, "Architects of the Web," Case: 1:08-cv-07322 Document #: 68 Filed: Jun. 26, 2009 p. 11 of 22 p. ID#:617, pp. 1-11.
Bookbrowse, "Non-Fiction Bestsellers" Excerpts from the Current Top 15 Bestsellers, pp. 1-16.
Comp.infosystems.www.authoring.html, "Message from Discussion how to get tool tip?" 1 page.
H. M. Gladney et al., "Digital Access to Antiquities" pp. 49-57.
Scottish Libraries, Issue No. 39, May/Jun. 1993, pp. 1-2.
"//w3c//dtd html 4.0 transitional//en", pp. 1-2.
"http://www.granarybooks.com.wstub.archive.org/boks/bernstein/bernstein1.html", pp. 1-4.
Current catalog: Granary (A-J) (NEXT: K-Z), pp. 1-19.
Hard Shell Word Factory—Electronic Books, pp. 1-13.
"http://www.nimitzclass.com.wstub.archive.org" pp. 1-4.
HarperCollins Pubslihers, pp. 1-6.
"http://www.harpercollins.com.wstub.archive.org" pp. 1-5.
HTML 4.0 Specification, W3C Recommendation, Dec. 18, 1997, pp. 1-363.
M. Landoni et al., Hyper-books and visual-books in an electronic library, vol. 11, No. 3, Jun. 1993, pp. 1-12.
R. G. Leach, "Electronic Document Delivery: New Options for Libraries," The Journal of Academic Librarianship, vol. 18, No. 6, p. 359-364, 1993.
M. Lesk, "Experiments on Access to Digital Libraries: How can Image and Text be used Together?" pp. 1-13.
M. Lesk, "Substituting Images for Books: The Economics for Libraries," http://www.lesk.com/mlesk/unlv.html.
JSTOR Citation List, Number of Citations 35, http://www.jstor.org/actions/showCitFormats?format=printerFriendly.
G. Marchinini et al., "Interfaces and Tools for the Library of Congress National Digital Library Program," Information Processing & Management, vol. 34, No. 5, pp. 535-555, 1998.
New Concepts Publishing: The cutting edge of electronic fiction! pp. 1-21.
Nimitz/Excerpt, pp. 1-13.
LexisNexis, Copyright 1996 M2 Communications Ltd. M2 Presswire, Oct. 7, 1996.
LexisNexis, Copyright 1997 Responsive Database Services, Inc., Business and Management Practices, Copyright 1997 Online Inc. Database, Feb. 1997.
Bold Type: An Online Literary Magazine, pp. 1-8.
Marc Cerasini, Clandestine: Past Summaries, pp. 1-5.
Scott Ciencin, Incarnate: Episode Summaries, pp. 1-4.
http://www.randomhouse.com.wstub.archive.org/releases/9711, pp. 1-10.
Spike Lee; Best Seat in the House, pp. 1-11.
"http://www.randomhouse.com.wstub.archive.org/features/preston/cobraevent/excerpt.html".
Invalidity Contentions—Exhibit B Obviousness, pp. B1-B25.
Invalidity Contentions—Defendants Initial Invalidity Contentions, Mar. 10, 2011, pp. 1-16.
Invalidity Contentions—Exhibit A Anticipation, pp. A1-A116.
Exhibit A-5 Books at random library, pp. 1-105.
Exhibit A-1 Books at random library, pp. 1-70.
Books@Random/New Releases, pp. 1-11.
"The Cobra Even by Richard Preston", Oct. 21, 1997, 1 page.
"http://www.randomhouse.com.wstub.archive.org/features/preston/" This file created Oct. 21, 1997 by Claris Home Page Version 2.0, pp. 1-2.
G. J. E. Rawlins, "Publishing Over the Next Decade," Journal of the American Society for Information Science 44 (8):474-479, 1993.
http://www.simonsays.com.wstub.archive.org/titles, pp. 1-5.
http://www.simonsays.com.wstub.archive.org/freshlink, pp. 1-12.
SimonSays: Fresh Ink, http://web.archive.org/web/19971007032039/www.simonsays.com/freshlink, pp. 1-10.
http://www.simonsays.com.wstub.archive.org/titles, pp. 1-4.
National of Congress American Memory, National Retail Dry Goods Asspication Bulletin, vol. 8, No. 8, Aug. 1926, pp. 1-3.
Universal Library: Welcome, http://web.archive.org/web/1990624003237/http://www.ul.cs.cmu.edu, pp. 1-2.
Antique Books: Tribadeau-Benoit Method, Sep. 1997, pp. 1-7.
"Featured Titles", pp. 1-10.
"Two Turtles—p. 1", pp. 1-7.
"Two Turtles—p. 2", pp. 1-7.
"Two Turtles—p. 3", pp. 1-7.
"Two Turtles—p. 4", pp. 1-7.
"Two Turtles—p. 5", pp. 1-7.
"Two Turtles—p. 6", pp. 1-7.
"Excerpt—Two Turtles", pp. 1-8.
"Two Turtles—Hardin/Ferkey-Houtgton", pp. 1-9.

(56) References Cited

OTHER PUBLICATIONS

Invalidity Contentions—Exhibit A—Anticipation, pp. 1-116.
Invalidity Contentions—ExhibitB—Obviousness, pp. 1-25.
Invalidity Contentions—Exhibit A01, Hard Shell Word Factory—Electronic Books, 13 pages.
Invalidity Contentions—Exhibit A02, Barnes and Noble.com, Business, Architects of the Web, 11 pages.
Invalidity Contentions—Exhibit A03, New Concepts Publishing, 22 pages.
Invalidity Contentions—Exhibit A04, Download hundreds of virtual books, many free, directly to your computer! 21 pages.
Invalidity Contentions—Exhibit A05, Books@Random/New Releases, 39 pages.
Invalidity Contentions—Exhibit A06, HarperCollins Publishers, 6 pages.
Invalidity Contentions—Exhibit A07, SimonSays: Fresh Ink, 10 pages.
Invalidity Contentions—Exhibit A08, List of the Top 15 Current Non-Fiction Bestsellers, including books about travel, adventure, biographies, science, history, health etc., 17 pages.
Invalidity Contentions—Exhibit A09, Granary Current Catalog, 20 pages.
Invalidity Contentions—Exhibit A10, National Retain Dry Goods Assocation, Library of Congress American Memory, vol. 8, No. 8, Aug. 1926, 4 pages.
Invalidity Contentions—Exhibit All, "Dogs and All About Them" 6 pages.

* cited by examiner

ENHANCING TOUCH AND FEEL ON THE INTERNET

This is a divisional of Ser. No. 09/505,646, filed Feb. 16, 2000, now U.S. Pat. No. 7,111,252.

This application claims priority from Provisional Application Ser. No. 60/155,543, filed on Sep. 22, 1999.

The present application relates to improvements in the user interface that enables enhancing simulation of real touch and feel over a remote information server.

More specifically, the present application describes enhancing the realism of product descriptions over the Internet, to make Internet shopping more like real life shopping.

BACKGROUND

Shopping over the Internet has become very popular. A primary reason is convenience. A user can sit at their computer and shop from a number of different Internet web sites. Without physically moving, the user can select from different items in different sites. The prices are often lower than, or at least comparable to, what one would pay in retail stores. The shopping is very convenient.

Internet browsing provides a limited amount of information about the product. In a store, if a user wants to select between multiple items, the user consults the packaging that accompanies the product. They can read the packages, look at information on the package, and touch the package. The packaging often sells the product. Large amounts of money are spent on packaging for the products.

Internet web pages often reflect minimal information about the product packaging. Hence, shopping on the Internet is most effective when the user already knows what they want.

Software such as Apple Quicktime VR™ allows some limited pseudo three-dimensional viewing.

SUMMARY

The present application teaches a new paradigm of selling over the Internet.

BRIEF DESCRIPTION OF THE DRAWINGS

These and other aspects will now be described in detail with reference to the accompanying drawings, wherein.

DESCRIPTION OF THE PREFERRED EMBODIMENT

Figure 1A:
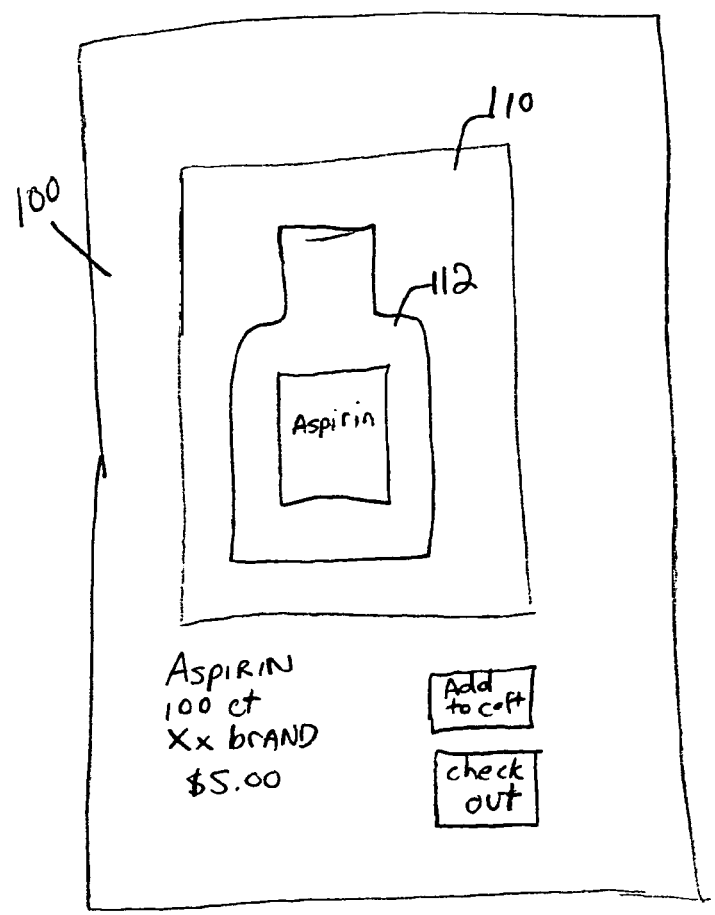
FIG. 1A shows a screen shot of an exemplary web page for selling a product.

According to the present application, a user interface is described which provides the same information to a user that could be provided if the user could physically pick up and handle the product.

According to one aspect of the present application, the entire product package is rendered in three dimensions. The rendering includes the shape and color of the product from at least a plurality of different angles, and specifically from at least enough angles to enable reading each label on the package. The user interface includes controls that enable moving the product within the user interface, in a way that enables viewing from each of these different angles.

One special application of this system is for use in books, music and videos. Bookstores are used by people who browse through the book selection, reading pages, looking at pictures, and trying to get the feel of the different books. The present system teaches an interface to the book contents that enables viewing the outside portion of the book, specified pages of the book, and leafing through random pages of the book. An embodiment limits the amount of reading that the user can do, to prevent the entire book from simply being read on line.

Another aspect of the above applies the same kind of operation to videos and music. The liner notes can be perused and the packaging of the video/music element can be viewed from different angles.

According to one aspect of this system, a special extension to hypertext markup language is defined. A hypertext mark up language extension/object is defined which can be hold the information that is contained in the three dimensions of the package being viewed. Another aspect allows the information to be used within other programs, e.g., Powerpoint, or an executable file.

A graduated view system which displays different amounts of information while loading additional information. The system starts by displaying a two-dimensional image, or "splash". The two-dimensional image itself is formed in a graduated manner, using a low resolution image, which is progressively increased in resolution as more information is received. The two dimensional image is shown while the three-dimensional image information is loading.

The final image can also be graduated. It can include lower resolution portions which show the ornamental portions of the object, and higher-resolution portions which show the readable portions of the object. In one embodiment, the higher-resolution portions are formed from ASCII text.

According to another aspect, an HTML extension is defined which enables the three dimensional viewing.

Another aspect defines a reduced data set for the system described above which enables separate views from different angles to simulate three dimensional viewing without actually using a continuous three dimensional view.

Another aspect teaches a new paradigm for selling products in which the products are exhibited on the Internet using information that is obtained from a three-dimensional view of the product that includes at least enough resolution to read each of a plurality of labels of the product, and to see the shape of the product from each of a plurality of different views. Another part of the paradigm has the seller of the product providing electronic images representing packaging information for the product. The web sites that sell the product can use that packaging information as parts of their website. Like stores, where every store gets a package for the product from the vendor, each Internet seller gets an electronic package for their product from the vendor.

The preferred embodiment will be described with reference to FIG. 1 which shows an exemplary web page using the present system. While the preferred embodiment describes this system being used on the Internet, it should be understood that this can be used on any remote information server that is used to sell products.

The product shown in this embodiment is a bottle of aspirin. The bottle of aspirin has a specified three-dimensional shape. The manufacturer of the aspirin produces the bottle and the packaging for the product. In this embodiment, the manufacturer also provides two different files, one being a progressively renderable two-dimensional JPEG image of the bottle as seen from the front. Another image is a three-dimensional rendering of the bottle. Such information can be produced using three-dimensional AUTOCAD™, or some other three-dimensional drawing program. The three dimensional rendering that is produced has at least sufficient resolution to enable reading all of the labels on the product. In FIG. 1A, a screen shown at an initial time is shown. A normal sales screen 100 includes the general description of the product, the price, and ability to "add to cart" and "Check out". FIG. 1A also shows a image portion 110.

The whole page—image portion 110 and the sales screen 100, are defined at step 200. The sales screen is defined using HTML code. The image portion is defined within the HTML code also and this can be displayed as a rectangle as shown in FIG. 1A.

Figure 2:
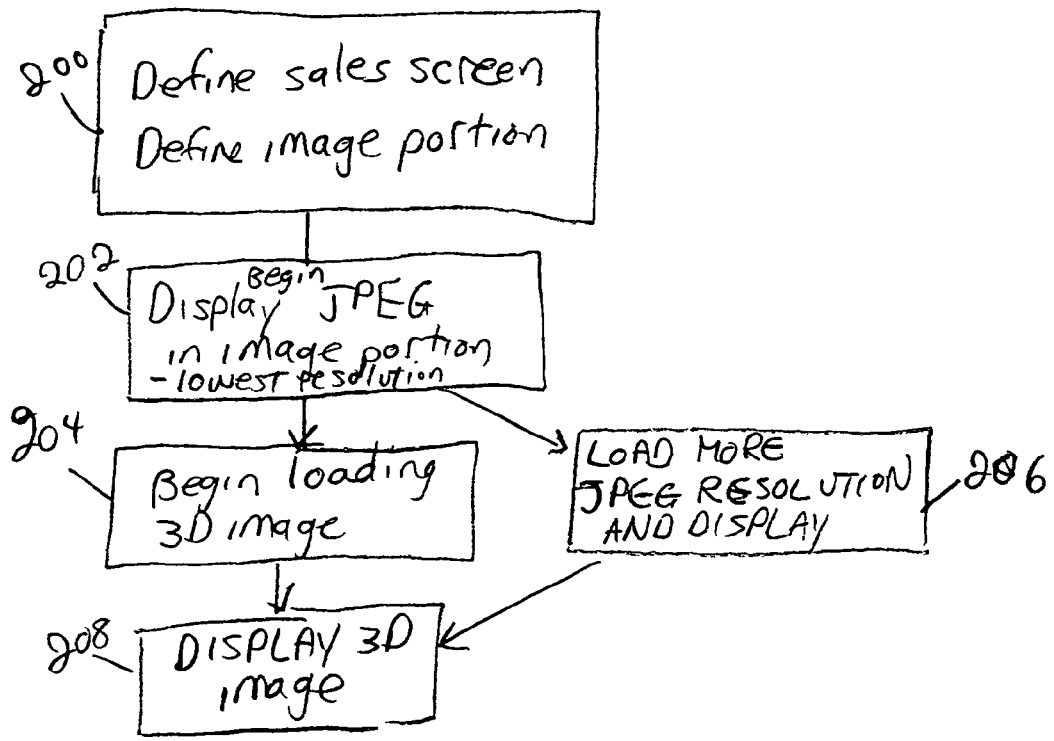
FIG. 2 shows a flowchart of operation of the first embodiment.

FIG. 1A shows a progressively-rendered two dimensional JPEG being displayed as 112. This is shown in the FIG. 2 flowchart. At step 202, the display of the progressively rendered JPEG begins. First the lowest resolution version is displayed at step 202. After the lowest resolution version is on the screen, the 3D image begins loading at step 204, and at the same time more information about the two-dimensional JPEG is loaded at 206. The JPEG resolution is increased by the additional information.

When the 3D image is completely loaded, a new image portion 110 is displayed at 208 that shows the information in the 3D image.

Figure 1B:
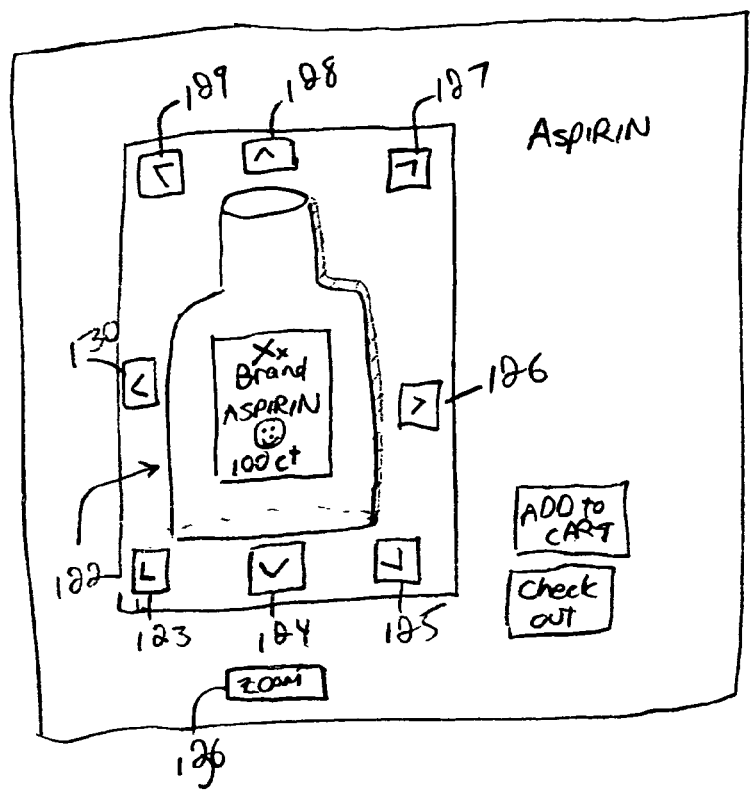
FIGS. 1B and 1C show views of the simulated 3D product, respectively from the front and the rear.
Figure 1C:
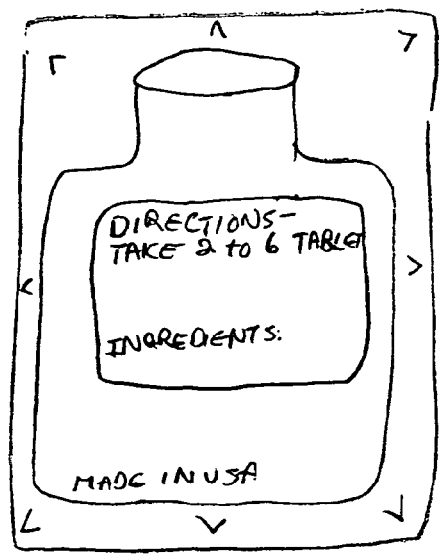

FIG. 1B shows this image portion including a simulated three-dimensional view of the product 122. A plurality of movement keys 123-130 define different movement directions. Each enables rotating the view of the product in the direction defined by the arrow of the key. FIG. 1B shows the front view. By manipulating the movement keys, the rear of the product 122 can be viewed. FIG. 1C shows the rear view.

Both of these views have sufficient size and resolution to allow the labels to be clearly visible and preferably large enough to be read. The user can also rotate the view to obtain different views—a side view, an edge view, and views of different labels.

The user can also actuate the zoom-in button 136 to zoom-in on a portion of the product. The zoom can be centered on the readable label so that the user can obtain a larger picture of the label to read the information from that picture. FIG. 1C shows a slightly zoomed-in version.

Figure 1D:
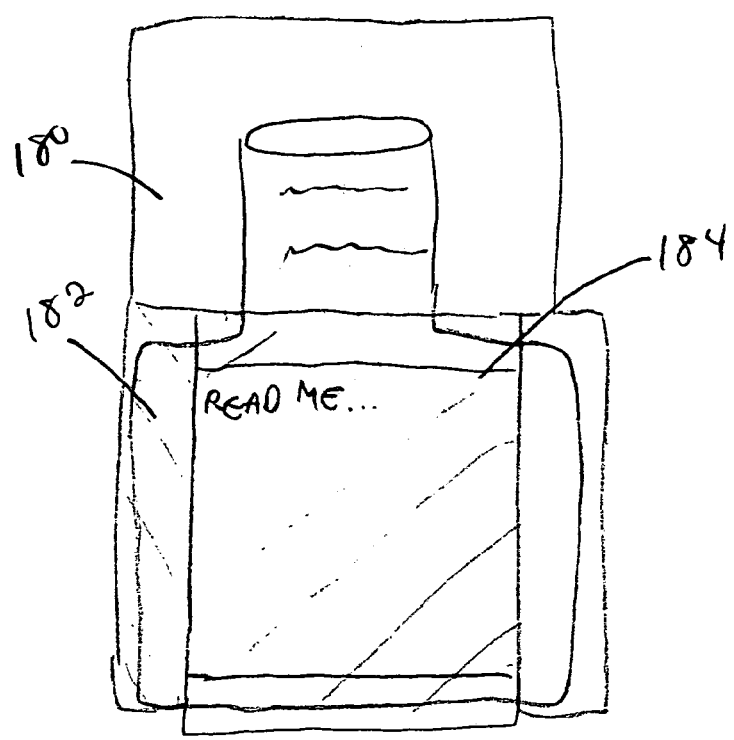
FIG. 1D shows an image formed of varying resolution portions.

Another aspect uses graded resolution for the image. The ornamental part of the packaging can be displayed with different resolution than the readable parts, e.g., the labels. In one embodiment, the actual product is formed of different zones as shown in FIG. 1D.

Each zone has a different kind of information, e.g., a highly compressed JPEG image portion 180 for the ornamental part, a less compressed JPEG portion 182 for more important parts, and finer resolution parts 184. The fine resolution part 184 can be ASCII or rich text format type textual information.

It should be appreciated from the above that the user can look at the product from any desired angle. The user can read all of the labels on the product, and can see packaging from different angles. In the case of a boxed product, the user can see the box from all different angles including front, back, top and sides. Another movement key can enable the user virtual opening of the box to see the product inside.

According to a preferred mode of carrying out this system, the entire three-dimensional image loads until it is completely loaded, and then it is displayed. The three-dimensional image is preferably compressed using lossy compression to minimize the size of the image.

In an alternative mode, only the view being called for is loaded. The remainder of the portions of the three-dimensional views are loaded in the background, or only loaded when requested.

Another embodiment of this system defines an extension to hypertext mark up language which simulates the three-dimensional representation of the product/packaging using a reduced data set. The true 3D image stores real 3D information that can be manipulated to see the object from any angle or view. In this HTML extension, in contrast, it is recognized that most objects can be looked at as being like a cube. The cube can be viewed from points 1-6 shown in FIG. 3A—front, back; top, bottom; left, right.

Figure 3A:
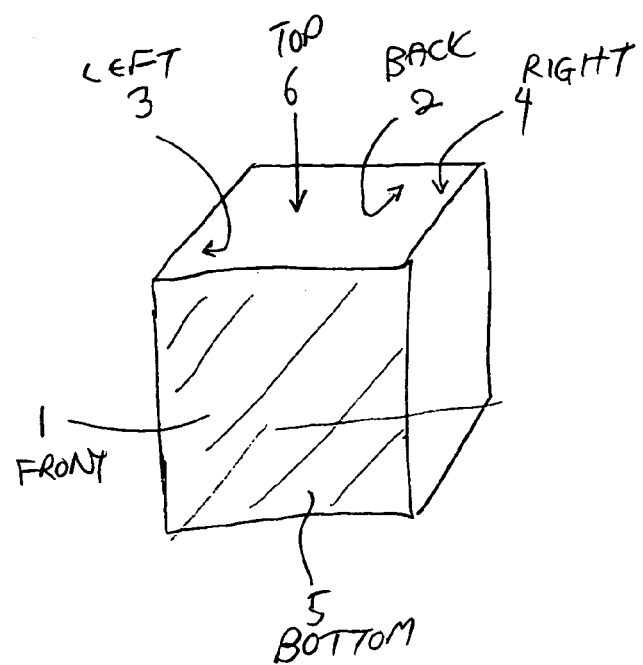
FIGS. 3A and 3B show different vantage points used to view an object to enable simulated three dimensional view.
Figure 3B:
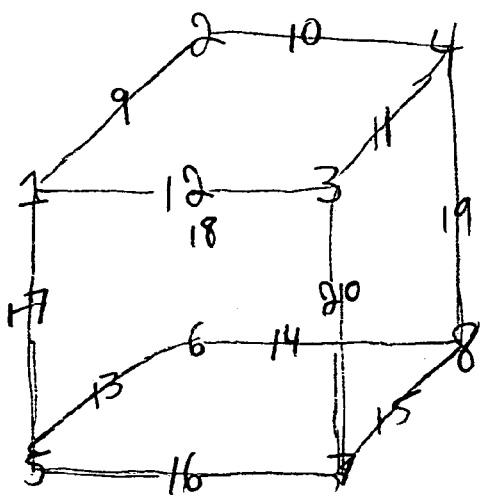

Additional vantage points may be desireable to allow viewing from angles. 20 additional points are shown in FIG. 3B. Therefore, 26 discrete images provides all the basic views that could simulate a three-dimensional view of the product.

A reduced data set view can be formed from only the six basic views in FIG. 3A, viewing the object from only the points 1 through 6 shown in FIG. 3A. An even further reduced data set can view the object only from front and back views without allowing viewing front, back, top and bottom.

Other combinations of these sets are also possible.

Figure 3C:
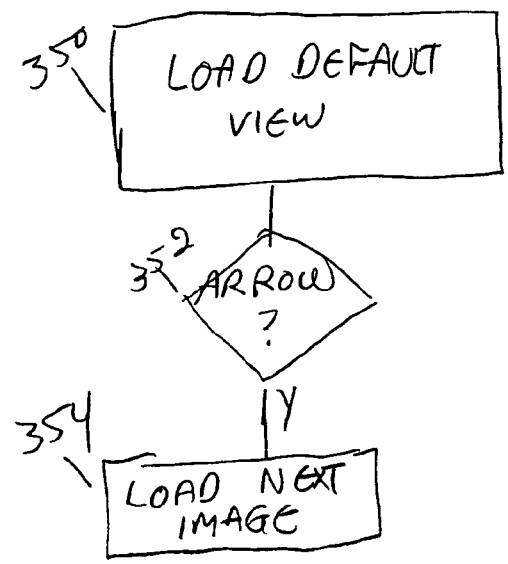
FIG. 3C shows a flowchart of operation with these simulated viewpoints.

According to this system, the product is first displayed from a default view in the product screen 100. The default view is one in which the front of the product, for example, is viewed. The image for each of the views is lossy-compressed using JPEG or MPEG compression. This default image loads first, as shown in step 350 in FIG. 3C. After the default image is loaded, the other n images, e.g. 21 other images, begin loading in the background. The HTML extension also displays arrow keys which enable rotation of the image and viewing the image from other vantage points. Depending on the number of images, each actuation of the arrow keys will select a different amount of rotation. The rotation is in actuality effected by displaying a different image.

The arrows are detected in step 352, and used to select a different image. The next image is loaded. For example, if the default view is loaded (front in FIG. 3A), then an arrow to the left selects view 17 in FIG. 3B. An arrow left/down (arrow 123 in FIG. 1B) selects view 5 in FIG. 3B. Each arrow operation can be used in conjunction with the map of views to select the next view for viewing.

This HTML code can be executed by loading the first JPEG and loading the remainder in the background, or can load the views only when requested.

This system allows the web site operator to select the amount of information they want to present. The amount of change from the arrows depends on the number of images that have been loaded. A reduced data set can be provided, or more information to show more about the product packaging. The smallest data set that contemplated is n=2 which would show the front and the back of the product. As in the other embodiments, preferably enough information is provided such that each of the labels on the product can be read, either directly, or using the zoom function. A particularly preferred form of compression uses an adaptable lossy compression where parts of the product are compressed with a first compression ratio, and the parts containing the label are stored in a different way. For example, the label could have more resolution, or be stored in text form.

The concept of touch and feel is quite prevalent in a bookstore. Many bookstores are common on the web, such as BarnesandNoble.com and Amazon.com. These provide very convenient browsing for an individual who knows what book they want to buy. The individual can often see a picture of the cover of the book, and read certain reviews about the book. However, the amount of data is often limited. Moreover, the data that is put on the website is typically data that is decided by the website designers, rather than the publishers of the book. The present paradigm allows those who package the book to decide what the book should look like, and what a buyer should see when they are thinking about buying the book.

In bookstores, readers can often sit and look at the books or even read from parts of the books. A user with enough determination can sit and read a whole book. Bookstores operate based on the assumption that most people will not read all books in that way. However, it enhances the experience of the bookstore. It allows the user to decide if they like the book or not.

The present embodiment teaches a remote information server sales paradigm, which starts by obtaining a digital image of at least parts of the book. Those digital images could be supplied by the publisher or designer and then used to provide information on the book to people reading the book. This allows the user to read parts of the book.

A problem would exist, however, if the entire book was freely available. In that case, any user could download the whole book and then read it on their computer at their leisure. Accordingly, the present system teaches limits on the amount of reading that can be done. A limit is defined that limits the amount of reading that can be done. The amount of reading is stored in a file indicating the user's activity, e.g., a "cookie". The cookie can expire or persist, as described herein. The cookie can be stored on the information server, or on the user's home computer. If the cookie expires, then additional reading can be done later. Another embodiment defines total limits, where the user is limited in the amount that they can read any title, and the cookie does not expire.

The present system also facilitates touch and feel like in the first embodiment. However, the touch and feel is modified for use in reading a book. A reader of a book looking at the exterior of the book needs only to see the front cover, back cover and spine. There is no need to see the top, bottom or other edges that do not typically contain viewed information. In addition, certain information is often printed on insides of the covers, on, for example, the liner notes. The book is virtually openable to read those inside portions. According to this embodiment, at least the covers, the liner notes and bio-graphic/informational notes, and the table of contents, if any are provided as digital images.

Figure 4A:
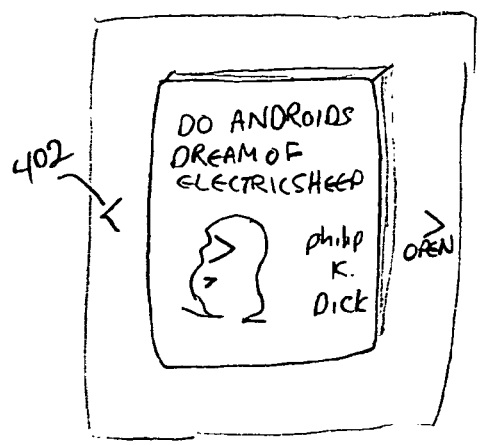
FIGS. 4A and 4B show a book display embodiment, showing the book from front and rear respectively.

A front view of the book as displayed on the web browser is shown in FIG. 4A. The view includes the front cover of the book showing an accurate depiction of the look of the book including the title, and artwork. The view has a resolution that is sufficient to enable the printing on the book to be read by a viewer. A number of additional manipulation keys are also defined to change the view of the book that is seen by a viewer.

A first manipulation key 402 defines turning over the book. When the cursor is placed over this key for about 2 seconds, a small text item, a "screen tip", is displayed indicating "turn the book over". If that key is depressed, the view changes to the view shown in FIG. 4B which shows the book from the back. Again, the colors and artwork of the book are accurately depicted. The printed portion of the book is displayed in a manner enabling that printed portion to be accurately read. As in the previous embodiments, this can use a graded resolution system, that provides more resolution for the readable parts of the book than is provided for the ornamental parts of the book.

Figure 4B:
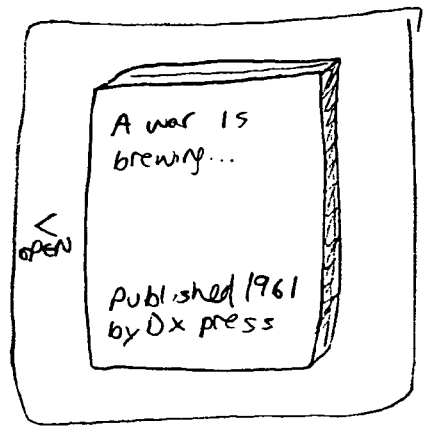
Figure 4C:
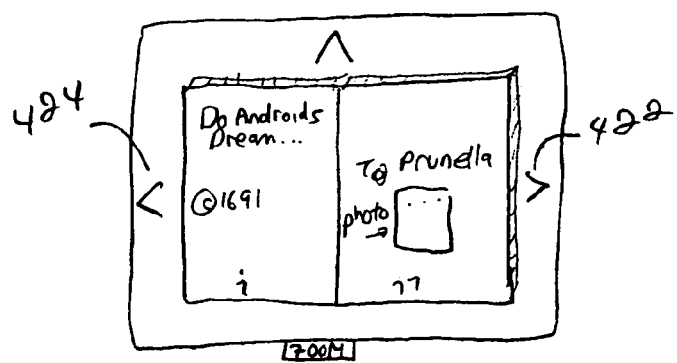
FIG. 4C shows the inside of the book.

An "open the book" indicia is also shown as element 506 in both the front and rear views shown in FIGS. 4A and 4B respectively. When the open book is actuated, the book is virtually opened. Clicking the open in FIG. 4A yields the screen shown in FIG. 4C which shows the first two printed pages of the book. A "zoom" function changes the operation to show only a single printed page, with enhanced detail. Clicking the open in FIG. 4B yields an analogous operation of opening from the rear of the book, exactly as the book would be opened if it were placed from the rear. This operation is not shown, but would yield the last two pages of the book. The front pages and rear pages of the book often include liner notes about the book, general information about the book or its author, pictures, and the like. One or more than one page of this information can be provided.

Two indicia 422 and 424 are also displayed respectively representing page forward and page backward. The page forward advances the open page by one sheet, much as it would look if the page were turned on a book. In the dual page display of FIG. 4C, this would be like paging forward in the book, to show two new pages. Page back 424 goes back by one sheet.

Note that the move keys are always shown as arrow keys. These keys change meaning based on context, but always mean that movement in some direction will be carried out.

Figure 5:
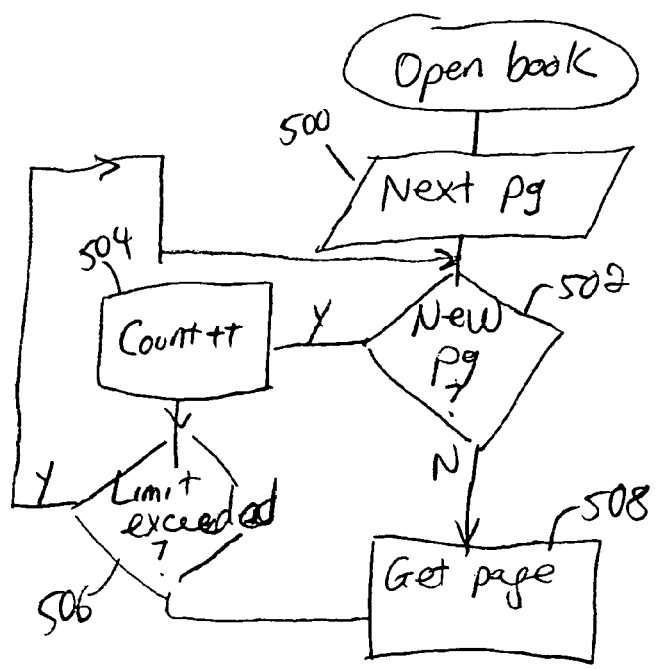
FIG. 5 shows a flowchart of operation of this embodiment.

Each open page enables reading the entire amount of print on the page. There may be no limit set for retrieval of certain pages such as liner notes, pictures and biographies, table of contents and indices. However, for actual text, some predefined limit on total new page requests can be defined. The user is allowed to read, for example, 20 pages out of the entire book. Each time a page that has a certain data type loads, it executes the flowchart of FIG. 5. A next page operation at 500 first detects if a new page is being requested, at 502. If so, a count is incremented at 504. When the counter reaches a specified value detected at 506, e.g. 20 times, further requests are prohibited. The counter can be present in a cookie, and the cookie can be reset, for example, each 24 hour period. This enables the user to come back a day later and look at other pages in the same book. If the limit is not exceeded, then the page is fetched at 508.

Just like being in a real bookstore—with enough patience and ingenuity, the entire book can be read. However, at any one sitting, the user can select a certain number of pages to read. For instance, the limit can also be set to only allow certain pages to be read, such as the first chapter only.

Right clicking on any of the images brings up a context menu which enables the different possible operation, e.g., close the book, a go-to dialog enabling changing to a specified page in the book and other navigation items.

Another modification describes allowing the limits on the book reading to be lifted by payment of a fee. In this embodiment, a fee, e.g. a book reading fee, could be charged for allowing the user to read the entire book. After paying this fee, the user gets unrestricted access to the whole book. The user can read the whole book in one or many sessions. The cookie can also store a bookmark, so that the user can return to their computer during a later session, and take up reading where they left off.

This embodiment has described reading books. However, these techniques can also be used for any other system in which the merchandise can be read. This can be used with music such as Cds, videos, etc. In those cases, the entire stored information can be the inside and outside of the covers, and the liner notes that go along with the music, e.g., length of songs, band members, song lyrics, etc.

Other embodiments are within the disclosed modes. For example, the present application is described as being used with HTML over the Internet. However, it could be used with any remote information server, using any programming language. For example, this could be used over a modem or other information line that is dialed up or connected point-to-point. The screens described herein could be compiled into, for example, an executable file that is downloaded with an instruction to execute upon receipt. Then, the file is executed to allow viewing the merchandise. The limits described herein in the "book reading" embodiment could be compiled as part of the code. Also, like in the embodiment, the whole book could be downloaded, and only part of it available for viewing. The rest would be viewable only after paying a fee. The rest could be, for example, encrypted, and the user is given the decryption code after paying the fee.

The embodiment has described images being used to represent the items. However, it should be understood that other forms are possible.

What is claimed is:

1. A method comprising:
sending a request from a user on a client computer connected to a network for more information about a specified product, said sending requesting first information about said specified product;
receiving said first information on said client computer responsive to said request, said first information including information indicative of a first two dimensional image of said product;
displaying said first two dimensional image on said client responsive to said receiving;
after said first two dimensional image has displayed on said client, and while said client is displaying said first two dimensional image, receiving additional information on said client indicative of a simulated three-dimensional view of said product also responsive to said request and without sending another request; and
subsequently to said receiving said first two dimensional image, and displaying said first two dimensional image and receiving said additional information, and responsive to said receiving said additional information, automatically displaying said simulated three-dimensional view on said client without sending another request other than said request.

2. A method as in claim 1, further comprising subsequently controlling a user at the client to view the product from different perspectives using said additional information.

3. A method as in claim 2, wherein the product is a product that comes in a bottle.

4. A method as in claim 2, wherein the product is a book.

5. A method as in claim 2, wherein said displaying comprises displaying said three dimensional view in place of said first two dimensional image on said client.

6. A method as in claim 1, wherein said three-dimensional view is automatically displayed when it is completely loaded.

7. A method as in claim 1, wherein said three-dimensional view is a simulated three-dimensional view that allows a user to view the product from multiple different directions.

8. A method as in claim 1, wherein said three-dimensional view is a continuous three-dimensional view that can be rotated.

9. A method as in claim 1, wherein said three-dimensional view starts loading when said first two-dimensional image has been displayed.

* * * * *